June 17, 1930.  E. W. SCHELLENTRAGER ET AL  1,764,355
BATTERY HANDLING METHOD
Filed June 20, 1927
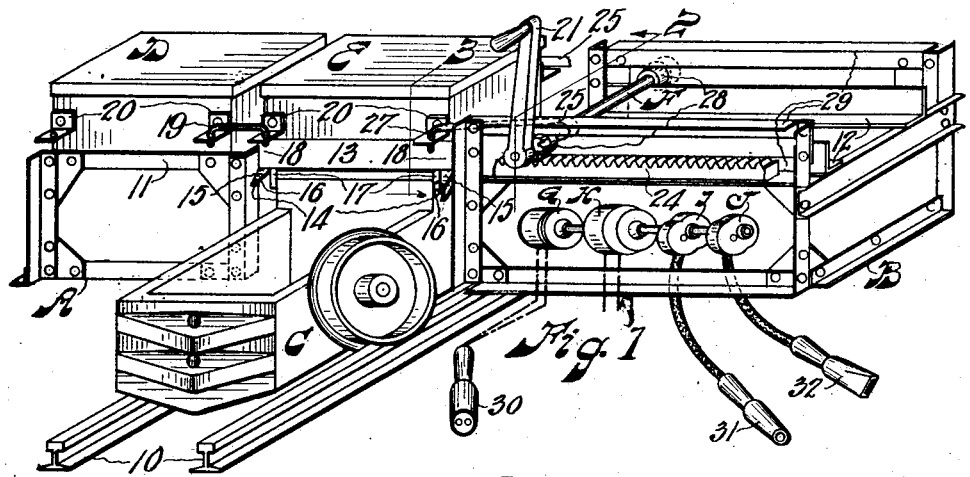
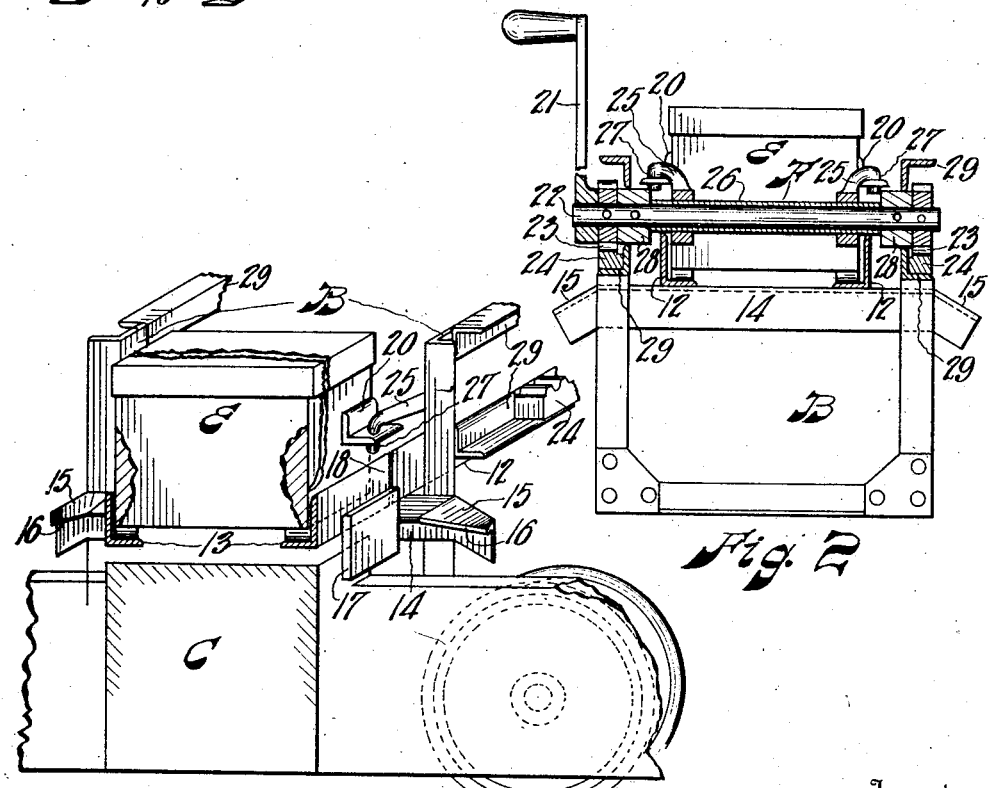
Inventor
E. W. Schellentrager
and
B. E. Clarkson
By
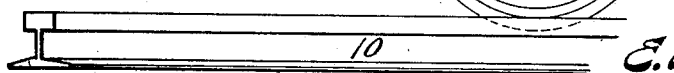 Attorney Patented June 17, 1930

1,764,355

UNITED STATES PATENT OFFICE

EUGENE W. SCHELLENTRAGER, OF SHAKER HEIGHTS, AND BRADLEY E. CLARKSON, OF CLEVELAND, OHIO, ASSIGNORS TO ATLAS BOLT & SCREW COMPANY, OF CLEVELAND, OHIO

BATTERY-HANDLING METHOD

Application filed June 20, 1927. Serial No. 200,266.

Our invention relates to methods of handling batteries and particularly to methods of moving batteries from one position or place to another.

The main object of our invention is to provide a simple, inexpensive, easily operable, efficient, and convenient method of handling batteries without affecting the same detrimentally. Other objects will appear, or become apparent or obvious, or will suggest themselves during the description of the method inherent in the apparatus shown in the accompanying drawing.

Batteries, particularly storage batteries, are heavy and cumbersome to handle and need re-charging or other rejuvenating occasionally. In many instances, as in storage battery locomotives for instance, it is quite undesirable to have the locomotive or other device idle while the battery thereof is being re-charged or rejuvenated. In order to keep the locomotive or other device in commission, a plurality of duplicate batteries are provided so that one or more of the batteries can be re-charged or rejuvenated while the locomotive or other device is in commission with a charged and rejuvenated battery thereon.

This duplicate battery feature requires that the batteries be taken off of and placed onto the locomotive or other device bodily and this taking off and placing on of the batteries should be done easily and quickly and in such a manner that the batteries will not be jarred or bumped so that the battery cases as well as the interiors thereof are not injured.

The handling of batteries with cranes or with other means such, as raising and lowering them vertically, creates shocks or jars in the batteries when the raising or moving is started as well as when the batteries are contacting their support.

The present invention aims to eliminate the shocks and jars on batteries by moving the same in such a manner that no sudden shocks or jars are brought thereon either during the moving of the same or at the beginning or at the end of the moving thereof, or during the re-charging or the rejuvenating thereof, and to attain this aim with a minimum expenditure of effort, time and cost.

In order to illustrate our invention, we have shown in the accompanying drawing a certain apparatus adapted to carry out the method of our invention in one aspect. This apparatus, and the particular method carried out thereby, was selected for illustration purposes and was taken from our co-pending application Serial No. 198,650, filed June 13, 1927; we are aware, however, that other apparatuses can be used to carry out our invention and that variations can be made in the apparatus so shown as well as in the method set forth as relating to the particular apparatus so shown and that variations can be made in our method as relating to apparatuses other than the one so shown within the scope of the appended claims.

In the accompanying drawing:—

Fig. 1 is a general perspective view of a certain apparatus adapted to carry out the method features of our invention and shows a pair of laterally spaced platforms with a locomotive track in the space between them, a locomotive on the track and in battery changing position in the space between the platforms, a sectional battery track or guide having one section thereof on the locomotive and other sections on each of the platforms, a battery resting on the guide section on one of the platforms, a battery resting on the guide section on the locomotive, a carriage to move the batteries, means for coupling the two batteries and the carriage so that one movement of the carriage moves both of the batteries simultaneously, and means for rejuvenating batteries while they are either on one or on both of the platforms or on the locomotive.

Fig. 2 is a section taken in a vertical plane indicated by the line 2 in Fig. 1 and shows, on a larger scale, the battery track or guide rails and the carriage and the guide means for the carriage.

Fig. 3 is a section taken in a vertical plane indicated by the line 3 in Fig. 1 and shows, on a larger scale, the battery track or guide rails on the locomotive transversely of the locomotive and elevated to the level of the track or guide rails on the platforms and the elevating means to elevate and align the sections of the battery track or guide means.

Similar reference characters refer to similar parts throughout the views.

In the apparatus shown in the accompanying drawing, to carry out our invention in one manner, we use, principally, two spaced platforms A and B and the locomotive C movable into the space between the platforms on the track rails 10.

A sectional battery track or guide is provided for the batteries D and E, or other batteries, to move or roll on and comprises the track section 11 mounted on the platform A, the track section 12 mounted on the platform B, and the track section 13 mounted on the locomotive C.

The section 13 is movable vertically and longitudinally transversely of the locomotive and is so mounted on the locomotive that the level thereof is either level with or below the level of the sections 11 and 12, not above the level of these sections in the particular apparatus shown, when no battery is on the locomotive; the purpose whereof will appear presently.

The members 14 extend across the underside of the inner ends of the sections 11 and 12 and each has the ends thereof bent downwardly to form the vertically inclined planes 15 and has the edges beveled to form the horizontally inclined planes 16.

The section 13 fits in between the inner ends of the sections 11 and 12 with as little clearance as possible. The locomotive runs on the rails 10 and can be run into and out of the space between the two platforms.

Usually, the rails 10 do not guide the locomotive sufficiently close to permit the little clearance mentioned between the ends of the battery track sections and the level of the section 13 drops down below the level of the sections 11 and 12, due to the weight of the battery, when a battery is resting on the section 13.

When and while the locomotive is run into the space between the platforms with the section 13 out of horizontal alignment with the space between the inner ends of the sections 11 and 12, one or the other of the plates 17 contacts the corresponding one of the horizontally inclined planes 16 and moves either the locomotive or the section 13 horizontally or laterally and thereby guides the same into the space between the inner ends of the sections 11 and 12. During this same movement of the locomotive, the ends 18 of the section 13 contact the vertically inclined planes 15 and the section 13 is thereby elevated or moved vertically up to the level of the sections 11 and 12 so that a continuous and even battery track or guide is provided which extends across the locomotive and on both of the platforms when the locomotive is run into aligning position and thereby permit batteries to be moved on the entire battery track or guide without jarring the batteries and with a minimum expenditure of effort or time or cost.

The batteries D and E are movable simultaneously in one moving operation by means of the coupler 19 having bent ends hookable into holes in the clip angles 20 fastened to the batteries.

The carriage F moves the batteries with a minimum expenditure of time or effort through the handle 21 rotating the shaft 22 and the gears 23 thereon in mesh with the racks 24 fixed on the platform B. The carriage is connectible with the batteries by means of the arms 25 secured to the sleeve 26 and rotatable therewith independently of the shaft and the free bent ends 27 hookable into the above mentioned holes in the clip angles 20. This structure provides a laterally movable connector in vertically movable relationship with the batteries.

The gears 23 are rotated when the handle 21 is rotated; the teeth of the gears 23 find abutment on the teeth of the fixed or stationary racks 24 and thereby force the shaft 22 and the sleeve 26 and the arms 25 to move longitudinally of the track on the platform and thereby move the now coupled batteries D and E in the guide or on the track thereof. The carriage is guided by the rollers 28 mounted on the shaft 22 and contacting the edges of the guide members 29.

Rotation of the handle 21 in either direction moves the carriage and the batteries in a corresponding direction so that a battery on one platform can be moved off of that platform and onto the locomotive while a battery on the locomotive is moved off of the locomotive and onto the other platform; all in one moving operation and with a minimum expenditure of effort or time or cost and without jarring the batteries.

While batteries are either on the platforms or on the locomotive, they can be re-charged by means of the charging plug 30 connected with the generator G driven by the motor H or they can be cleaned either by means of the nozzle 31 connected with the air pump I driven by the motor H or by means of the nozzle 32 connected with the water pump J driven by the motor H. Other means may be used or added; the object being to provide the necessary means for rejuvenating batteries while the same are either on the platforms or on the locomotive.

The apparatus shown and described carries out our method of vertically and horizontally or laterally aligning the sections of a sectional battery track to move batteries thereon with a minimum expenditure of effort or time or cost and without jarring the batteries and to rejuvinate the batteries so that the batteries of locomotives or other mobile element can be changed or rejuvenated with a minimum expenditure of effort or time or cost and so that batteries can be changed or rejuvenated without holding up the movable element.

Having described our invention in one aspect and being aware that changes and modifications can be made therein within the scope of the appended claims, we do not desire to limit ourselves to the precise steps and the means to carry out the same as shown and described.

We claim:—

1. A method of the character described including moving a section of a battery track into horizontal alignment with another section of said track and aligning the first said section vertically with said other section by movement of the first said section.

2. A method of the character described including moving a section of a battery track transversely of another section of said track and aligning the first said section horizontally and vertically with said other section by movement of the first said section.

3. A method of the character described including moving a section of a battery track transversely of another section of said track and guiding the first said section into position longitudinally adjacent to said other section and vertically aligning the first said section with said other section by movement of the first said section.

4. A method of the character described including moving a section of a battery track transversely of another section of said track and guiding the first said section into position longitudinally adjacent to said other section and horizontally and vertically aligning the first section with said other section by movement of the first said section.

5. A method of the character described including moving a section of a battery track transversely of two spaced sections of said track and guiding the first said section into the space between said spaced sections and horizontally and vertically aligning the first said section with said spaced sections by movement of the first said section.

6. A method of the character described including moving a locomotive with a battery track thereon into a position adjacent to another battery track and guiding the first mentioned track into position longitudinally adjacent to said other track and aligning the first track horizontally and vertically with said other track by movement of said locomotive but independently of the direction of said movement of the locomotive.

7. A method of the character described including moving a locomotive with a battery thereon adjacent to a platform having a battery thereon and to a platform having a moving means guided to move thereon in a definite path, connecting both of said batteries endwise at both sides thereof, connecting said moving means to one of said batteries at both sides thereof, and moving said moving means in one direction and thereby moving said battery on the locomotive onto said platform having the moving means and said battery on the first said platform onto said locomotive in a path substantially in alignment with the path of movement of said moving means.

8. A method of the character described including moving a locomotive with a battery track and a battery thereon adjacent to a platform having a battery track thereon, aligning said tracks by and during movement of said locomotive, and moving said battery off of said locomotive and onto said platform by operating a gear and rack mechanism on said platform and connected with said battery.

9. A method of the character described including moving a locomotive with a battery track and a battery thereon into a space between two platforms having a battery track and a battery and a gear and rack mechanism thereon, aligning all of said tracks by and during movement of said locomotive, connecting both of said batteries to each other and to said gear and rack mechanism, and simultaneously moving both of said batteries on said tracks by operating said gear and rack mechanism.

10. A method of the character described including vertically and horizontally aligning a section of a sectional battery track on a movable element with a section on a stationary element by and during the movement of said movable element into proximity of said stationary element.

11. A battery handling method including moving a locomotive with a battery thereon toward a platform and using said movement to align the bottom of said battery with the top of said platform for removal of said battery.

12. A battery handling method including moving a locomotive with a battery thereon toward a platform and using said movement to align the bottom of said battery with the top of said platform for exchange of said battery.

13. A battery handling method including moving a locomotive with a battery thereon toward a platform and using said movement to elevate said battery vertically of said locomotive and align the bottom thereof with the level of said platform for exchange of said battery.

14. A battery handling method including moving a locomotive with a battery thereon toward a platform having a battery thereon, using said movement to align the bottom of said battery on the locomotive with the top of said platform, coupling said batteries together, and moving either one of said batteries and thereby exchange said batteries.

15. A battery handling method including moving a locomotive with a laterally confined but vertically movable battery thereon toward a platform and using said locomotive movement to move said battery vertically for alignment of the bottom of said battery with the top of said platform for lateral movement of said battery.

16. A battery handling method including moving a locomotive with a battery thereon toward a platform, using said movement to align the bottom of said battery with the top of said platform, taking hold of said battery through a vertically movable connector, and moving said connector laterally to move said battery.

17. A battery handling method including moving a locomotive with a battery thereon toward a platform having a battery thereon, using said movement to align the bottom of said battery on the locomotive with the top of said platform, connecting both of said batteries in vertically movable relationship, taking hold of one of said batteries through a vertically movable connector, and moving said connector laterally to exchange said batteries.

In testimony of the foregoing we affix our signatures.

EUGENE W. SCHELLENTRAGER.
B. E. CLARKSON.